Dec. 17, 1929.  A. E. SCHUTTE  1,739,804
APPARATUS FOR SPREADING AND LEVELING ROAD MATERIALS
Filed Jan. 2, 1929
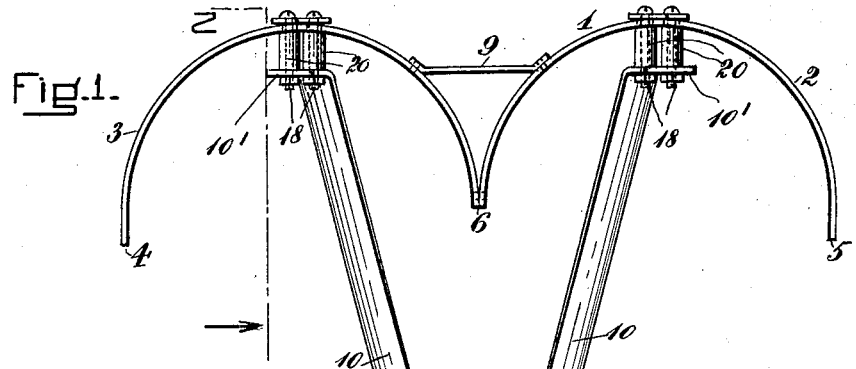
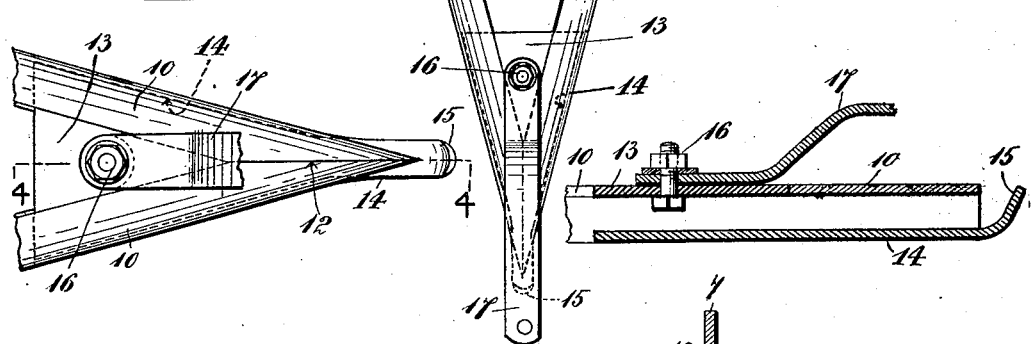
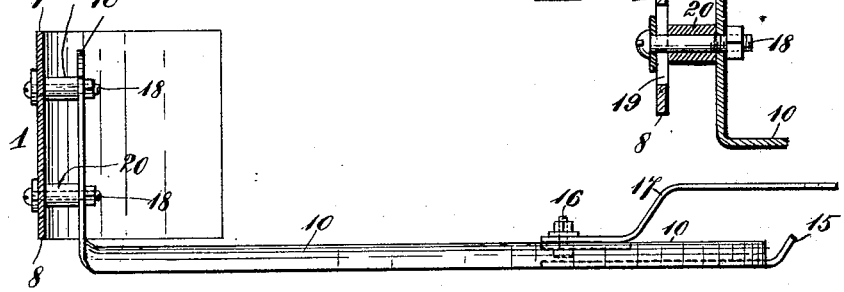
INVENTOR=
August E. Schutte
By John E. R. Hayes
ATTORNEY=

Patented Dec. 17, 1929

1,739,804

UNITED STATES PATENT OFFICE

AUGUST E. SCHUTTE, OF NORTHBORO, MASSACHUSETTS

APPARATUS FOR SPREADING AND LEVELING ROAD MATERIALS

Application filed January 2, 1929. Serial No. 329,808.

In laying roadways, especially of the bituminous kind, it is customary to bring the material, either the binder or the surface mixture, to the street, dump the load, shovel the material into place, giving the layer more or less uniformity, and raking and combing such layer until uniform in thickness and then compressing with a roller. This method has been used for half a century and has not been improved upon up to the present day.

Some attempts have been made to spread dry stone by confining the stone in a hopper and dragging the hopper along the road, allowing a certain amount to escape through a lower orifice. Such a machine is cumbersome and necessarily is confined to a very small area and requires a great deal of power on account of the fact that the whole load is carried in the hopper. Attempts have been made to utilize a similar hopper for hot bituminous materials without results. A further defect of the old method is segregation, for as the hopper of the nature above described, is dragged along the road and if it contains fine materials, this fine material, on account of the jarring and jolting, is sifted to the bottom and is laid first, leaving the material which remains in the hopper devoid of any fine, and the resulting layer will be deprived of such material.

Among the objects of the present invention is to spread and level the material after it has been deposited upon the base or roadway by so operating that the material lying above a determinate level will be moved laterally and fall over other portions of the deposited material with a cascading effect, thereby assuring uniformity in the resulting layer; to provide means whereby the deposited material may be spread and leveled through force applied by the truck or wagon depositing the material on the ground or roadway; to provide an apparatus relatively light and portable; to provide means whereby the apparatus during the operation of spreading and leveling will be held down in position to properly function by the weight of the material acted upon after it has been deposited; to provide means whereby the apparatus will at all times be held leveled with relation to the mean level of the base or roadway upon which it is operating; and to provide an apparatus that will leave no streaks in the surface of the material after it has been spread and leveled.

The invention can best be seen and understood in the light of the drawings, in which—

Figure 1 is a plan of the apparatus.

Fig. 2 is a view partly in section and partly in side elevation of a portion of the apparatus taken on the line 2—2 of Fig. 1.

Fig. 3 is a plan in enlarged detail of a portion of the apparatus.

Fig. 4 is a section taken on the line 4—4 of Fig. 3, and

Fig. 5 is a cross section of a detail of construction.

Referring to the drawings:—

1 is an upright rigid member or drag made of heavy sheet metal preferably cycloidal in form with integral curved parts 2 and 3, respectively. The drag presents along its sides front cutting edges 4 and 5, respectively, and at its centre a front cutting edge 6. These front cutting edges facilitate the drawing of the drag through the material to be spread and leveled which is deposited upon the base or roadway in front of the drag. The drag may have any desired dimensions. In practice a drag is employed some 8 to 12 feet in width measured on a line between its side edges 4 and 5, while in height the drag is some 18 inches measured on a line between its top and bottom edges 7 and 8, respectively.

The drag is preferably reinforced at its back on the outside by a brace 9 the opposite ends of which are welded to the drag body between its respective curved parts 2 and 3.

Fixed to the parts 2 and 3 of the drag on the inside are brace-forming members 10, 10 which assist in strengthening and reinforcing the drag and at the same time perform other useful functions as will later be explained. The members 10, 10 are flat bars of relatively heavy metal and preferably of considerable width. Each of the members is provided with an upturned end 10'. The members 10, 10 are also bars of some considerable length generally horizontally arranged so as to extend forward along the base or roadway on which the drag is operating, resting thereon. The members are angularly arranged with relation to one another, the forward free ends of the bars being brought together and securely fastened at a point well forward of, and in line with the centre of the drag. From the point of their fastening the members 10, 10 diverge toward the opposite sides of the drag and the upturned ends 10' of the members are securely fastened to the parts 2 and 3 of the drag as will later be explained.

The meeting ends of the members 10 may be fastened together in any suitable manner but preferably by brazing. For a purpose later to be referred to, the members 10, 10 are preferably outwardly inclined, each member inclining upward from the outer side edge thereof. Thus inclined, the meeting ends of the members may be brought together and brazed along a meeting line or joint 12. Just back of this joint, within the apex formed by the meeting end portions of the members, is placed a triangular insert 13 of relatively heavy metal and this insert is brazed to the respective members. On the under side beneath the joint 12 and insert 13 the meeting ends of the members are provided with a heavy piece of metal 14 forming a shoe on which the connected forward ends of the members may rest upon the ground or roadway and draw over it as the drag is moved. The shoe 14 is provided with an upturned forward end or point 15 in order that it may freely slide over the base or roadway.

Apart from strengthening and reinforcing the drag the members 10, 10 form part of the connection by which the drag is drawn along the base or roadway on which it is operating, for fastened to the metal insert 13 between the meeting ends of the members by a bolt and nut connection 16 is a tongue or draw member 17. This tongue extends forward from the point of its fastening with upward inclination so that the free end of the tongue may be secured to a truck or agent for moving the drag. The inclination or curvature of the tongue is such that as draft is exerted upon the tongue the tendency will be to hold down the forward ends of the members 10, 10 with attached shoe 14 onto the base or roadway so that the shoe 14 will slide thereon.

The drag is so supported that its bottom edge 8 will lie a determinate distance above the base on which the drag is operating and over which the material is to be spread and leveled. To this end the drag is provided with adjustable legs which extend below the bottom edge of the drag with bearing on said base. The upturned ends 10', 10' of the members 10, 10, connected as they are to the drag, form these legs, inasmuch as they extend below the bottom edge of the drag and will rest upon the base with the members 10, 10 from which the upturned ends 10', 10' extend forming elongated feet to the legs and becoming the immediate parts contacting with the base, being moved or drawn over the surface thereof as the drag is moved. The legs thus provided are vertically-adjustable inasmuch as the upturned ends 10', 10' of the members 10, 10 are adjustably fixed to the drag by bolt and nut connections 18, the bolts passing through vertical slots 19 formed in the drag which permit of a vertical adjustment of the bolt and nut fastenings. In connection with the fastening of the upturned ends 10', 10' to the drag it will also be noted that these ends extend upward on the interior side of the drag and are spaced from it by means of collars 20 arranged upon the bolts. This spacing brings the legs formed by the upturned ends 10', 10' and inner end portions of the members 10, 10 to lie forward of the bottom edge of the drag; this essentially for a purpose later to be explained.

With the drag thus supported in an elevated position on adjustable legs and these legs in turn secured to or borne by angularly arranged flat members 10, 10, which bear upon the ground or roadway and are shod upon their forward meeting ends by the shoe 14, the drag will accordingly be adjustably mounted as it were upon a shallow sled or plow generally triangular in form and of considerable length and range of bearing, and which sled, holding contact with the ground or roadway, is adapted to plow through and beneath the deposited material.

Preliminary to the operation of the apparatus the material to be spread and leveled is first deposited upon the base or roadway within the area embraced or encircled by the drag. Accordingly the material thus deposited will cover the sled-forming members 10, 10 which on account of the weight of the material upon them will operate through their upturned leg-forming extensions 10', 10' connected to the drag, to hold down the drag and prevent its lifting as the drag is moved through the deposited material. On this account the members 10, 10 are made relatively wide as previously noted and are also preferably so inclined as to offer resistance to their being drawn through the deposited material resting upon them, so increasing their holding-down effect exerted upon the drag.

Inasmuch as the members 10, 10 or sled formed by them have considerable relative extension over the surface of the ground or roadway, they will accordingly maintain by their bearing a position corresponding with the mean level of said roadway especially when its surface is an uneven surface, and therefore the bottom edge 8 of the drag will be maintained to lie at a determinate distance above said mean level of the base or roadway.

As previously explained, the leg supports for the drag provided by the upturned ends 10', 10' of the members 10, 10 are arranged forward of the bottom edge 8 of the drag leaving a considerable space back of these legs and between them and the bottom edge of the drag. This enables the deposited material to fill in back of the legs as the drag is moved through the material so that the bottom edge of the drag, acting as a drawing or leveling edge, will contact with the fill at the points back of the legs as well as at other points, preventing the legs leaving streaks in the surface of the material after it has been spread and leveled. In this same connection, in order that the leg supports provided the upturned ends 10', 10' of the members 10, 10 may cut through the deposited material with as little resistance as possible, the leg supports are preferably inclined in the direction of the path described by the drag as it is moved.

The operation of using the apparatus is as follows:—

Assuming the apparatus in place upon the foundation or base upon which the material is to be spread and leveled and assuming also that the drag has been so adjusted by adjustment of its legs that the bottom drawing edge thereof will lie above the base or foundation a distance corresponding with the thickness of the layer desired: The material to be spread, brought preferably by truck, is dumped directly in front of the drag in the area embraced by it and upon the members 10, 10 of the apparatus or sled. The material having thus been deposited, the tongue or draw bar of the apparatus is attached to the truck and the drag then moved through the deposited material. As the apparatus is moved the forward ends of the members 10, 10 or sled will be held down onto the ground or roadway by the tongue or draw member of the apparatus. At the same time said members or sled will draw through the deposited material beneath it and the material by its weight will operate to hold down the drag which is drawn through the material, spreading and leveling it, the bottom leveling edge of the drag then maintaining a determinate position above the mean level of the ground or roadway as previously explained. If the thickness of the layer to be spread is great the whole of the contents of the truck can be dumped at once. If, however, a thin layer is desired, it is preferable to dump part of the load in front of the drag, then attach it to the truck and move the drag through the deposited material until it is spread and leveled; then the rest of the material can be dumped, either in whole or in part, and processed as before.

Ordinarily a series of drags are used on a job, especially if the roadway or foundation to be covered is quite wide, the drags being so arranged as to lap by one another and so embrace the entire surface to be covered.

The action of the drag is simply a scraping action which takes off the top of the material dumped in front of it and, on account of its curved or cycloidal formation, it causes the material in excess of the layer to fall over itself with a more or less cascading effect inwardly into the path of the drag, thus retaining homogeneity throughout the whole layer and preventing separation and segregation of any of the material. This effect is not only desirable but of paramount importance for uniformity of result and workmanship.

The apparatus can be made comparatively light inasmuch as it does not carry the deposited material and need have only sufficient strength to withstand the stress of spreading and leveling the deposited material.

In connection with the holding down of the drag to a determinate level by the weight or action of the deposited material upon the members 10, 10 of the apparatus or sled, the force or effect thus exerted will remain a substantially constant force as long as there is any material to be spread and leveled in front of the drag.

While the drag has been described as preferably cycloidal in form, it may take the form of a simple curve or be otherwise formed as desired. Numerous other changes, also, in the details of construction of the various parts may be made without departing from the spirit of the invention.

Having thus fully described my invention, I claim and desire to secure by Letters Patent of the United States:—

1. A combination spreader and leveler for roadways comprising a drag presenting a bottom leveling edge, means for supporting the drag whereby the bottom leveling edge thereof will lie a determinate spaced distance above the roadway as the drag is moved along the roadway through the material deposited thereon to be spread and leveled, and means whereby force may be exerted for drawing the drag along the roadway through said material and permitting of said determinate positioning of the bottom leveling edge of the drag being maintained.

2. A combination spreader and leveler for roadways comprising a drag presenting a bottom leveling edge, means for supporting the drag whereby the bottom leveling edge thereof will lie a determinate spaced distance above the roadway as the drag is moved along the roadway through the material deposited thereon to be spread and leveled, means whereby said material will exert draft for holding down the drag and maintaining the leveling edge thereof in its determinate position as aforesaid, and means whereby force may be exerted for drawing the drag along the roadway through said material and permitting of said determinate positioning of the bottom leveling edge of the drag being maintained.

3. A combination spreader and leveler for roadways comprising a drag having an upright body generally curved in form with open top and bottom, and presenting a bottom leveling edge, means for supporting the drag whereby the bottom leveling edge thereof will lie a determinate spaced distance above the roadway as the drag is moved along the roadway through the material deposited thereon to be spread and leveled, and means whereby force may be exerted for drawing the drag along the roadway through said material and permitting of said determinate positioning of the bottom leveling edge of the drag being maintained.

4. A combination spreader and leveler for roadways comprising a drag generally curved in form with open top and bottom, and presenting a bottom leveling edge, an adjustable leg support for the drag for maintaining the drag in a raised position above the roadway and the bottom leveling edge thereof in a determinate spaced position in relation thereto, means whereby draft may be exerted for holding down the drag, and means including an angular draw-bar connecting with the drag whereby force may be exerted for drawing the drag along the roadway through said material and permitting of said determinate positioning of the bottom leveling edge of the drag being maintained.

5. A combination spreader and leveler for roadways comprising a drag generally curved in form with open top and bottom, and presenting a bottom leveling edge, an adjustable leg support for the drag for maintaining the drag in a raised position above the roadway and the bottom leveling edge thereof in a determinate spaced position in relation thereto, means whereby said material will exert draft for holding down the drag, and means whereby force may be exerted for drawing the drag along the roadway through said material and permitting of said determinate positioning of the bottom leveling edge of the drag being maintained.

6. A combination spreader and leveler for roadways comprising a drag presenting a bottom leveling edge, means for supporting the drag whereby the bottom leveling edge thereof will lie a determinate spaced distance above the roadway as the drag is moved along the roadway through the material deposited thereon to be spread and leveled, said means including leg supports fixed to the drag and lying forward of the bottom leveling edge thereof, and means whereby force may be exerted for drawing the drag along the roadway through said material and permitting of said determinate positioning of the bottom leveling edge of the drag being maintained.

7. A combination spreader and leveler for roadways comprising a drag presenting a bottom leveling edge, legs for supporting the drag whereby the bottom leveling edge thereof will lie a determinate spaced distance above the roadway as the drag is moved along the roadway through the material deposited thereon to be spread and leveled, members connecting with said legs with extension into the space forward of the drag and upon which the material to be spread and leveled may be deposited, and means whereby force may be exerted for drawing the drag along the roadway through said material and permitting of said determinate positioning of the bottom leveling edge of the drag being maintained.

8. A combination spreader and leveler for roadways comprising a drag presenting a bottom leveling edge, legs for supporting the drag whereby the bottom leveling edge thereof will lie a determinate spaced distance above the roadway as the drag is moved along the roadway through the material deposited thereon to be spread and leveled, and means whereby force may be exerted for drawing the drag along the roadway through said material, said means including members connecting with said legs in the space forward of the drag and upon which the material to be spread and leveled may be deposited.

9. A combination spreader and leveler for roadways comprising a drag presenting a bottom leveling edge, an elongated support for the drag having extension forward thereof over the face of the roadway with bearing thereon whereby it may occupy a position substantially commensurate with the mean level of the roadway, means for mounting the drag on the support whereby the bottom leveling edge of the drag will lie a determinate spaced distance above the support and mean level of the roadway, and means whereby force may be exerted to draw the support and drag through material deposited upon the roadway in front of the drag.

10. A combination spreader and leveler for roadways comprising a drag generally cycloidal in form and presenting a bottom leveling edge, a carriage for the drag including leg supports for maintaining the drag in a raised position above the roadway and the bottom leveling edge of the drag in a determinate spaced position in relation thereto, said carriage having extension over the surface of the roadway forward of the drag and adapted to draw through and beneath material deposited upon the roadway in front of the drag to be spread and leveled thereby, and means whereby force may be exerted to draw said carriage and drag through the deposited material and at the same time hold down onto the surface of the roadway the forward end of said carriage.

11. A combination spreader and leveler for roadways comprising a drag presenting a bottom leveling edge, a sled supporting said drag, said sled being adapted and arranged to have extension forward of the drag over the surface of the roadway with sliding bearing thereon and to draw through and beneath material deposited on the roadway in front of the drag whereby the weight of said deposited material will hold down the drag as the sled is drawn through, the deposited material, means for supporting the drag on said sled whereby the bottom leveling edge of the drag will lie a determinate spaced distance above the surface of the roadway, and means whereby force may be exerted to draw said sled and drag through the deposited material and at the same time hold down onto the surface of the roadway the forward end of said sled.

AUGUST E. SCHUTTE.